United States Patent
Fleury, Jr.

(10) Patent No.: US 6,886,586 B2
(45) Date of Patent: May 3, 2005

(54) SYMMETRICAL VALVE CONFIGURATION

(75) Inventor: Leo W. Fleury, Jr., North Smithfield, RI (US)

(73) Assignee: Mueller International Inc., Decatur, IL (US)

( * ) Notice: Subject to any disclaimer, the term of this patent is extended or adjusted under 35 U.S.C. 154(b) by 0 days.

(21) Appl. No.: 10/866,400

(22) Filed: Jun. 11, 2004

(65) Prior Publication Data

US 2004/0250854 A1 Dec. 16, 2004

Related U.S. Application Data

(60) Provisional application No. 60/478,596, filed on Jun. 13, 2003.

(51) Int. Cl.[7] .............................................. F16K 25/00
(52) U.S. Cl. .................................. 137/329.04; 251/334
(58) Field of Search .............................. 251/356–368, 251/333–334; 137/329.02–329.04

(56) References Cited

U.S. PATENT DOCUMENTS

| 4,044,993 A | * | 8/1977 | Wheeler | 251/158 |
| 4,073,307 A | * | 2/1978 | Royce | 137/283 |
| 4,621,656 A | * | 11/1986 | Ichimaru | 137/625.66 |
| 4,842,246 A | * | 6/1989 | Floren et al. | 251/333 |
| 6,772,993 B1 | * | 8/2004 | Miller et al. | 251/363 |

* cited by examiner

*Primary Examiner*—Paul J. Hirsch
(74) *Attorney, Agent, or Firm*—Brian L. Michaelis; Brown Rudnick LLP

(57) ABSTRACT

A compression-type valve seating ring device for sealingly engaging the valve seat. The seating ring device includes a resilient cylindrical body having a central axis and having a side surface, a top surface and a bottom surface. A first inward bevel is defined circumferentially from the side surface toward the top surface, and a second contour is defined circumferentially between the first bevel and the top surface, wherein the first bevel provides a seating surface and the second contour enhances the seal and life of the valve. The valve element is configured symmetrically such that top and bottom sides are substantially identical.

8 Claims, 5 Drawing Sheets

SYMMETRICAL VALVE CONFIGURATION

CROSS REFERENCES TO RELATED APPLICATIONS

This application claims priority from Provisional Patent Application 60/478,596, filed Jun. 13, 2003, which is incorporated herein by reference.

FIELD OF THE INVENTION

The present invention relates to the field of valve seats used to stem the flow of a fluid within a valve and more particularly to an improved main valve seat for use in a fire hydrant having improved sealing and replacement characteristics.

BACKGROUND OF THE INVENTION

Known hydrant valve seat configurations are illustrated in FIG. 1 through FIG. 4. The hydrant 10 generally includes a vertical barrel 12 which extends upwardly from a connection with a contoured shoe 32, which is connected to a water supply pipe. A drain ring housing 20 is secured between barrel 12 and contoured shoe 32 via a bolt 26 and is sealed with respect to barrel 12 using a gasket 28. A bronze seat ring 22 is threadedly engaged to an interior portion of drain ring housing 20 through a threaded connection 24. Seat ring 22 has a beveled seating surface 23 defined in an interior portion thereof for sealing against a main valve element 36. Typically, main valve element 36 includes a side surface 46, a top surface 44, a bottom surface 48 and a first beveled portion 37 disposed between side surface 46 and top surface 44. In operation, a valve stem 14 would be pulled up, causing a valve plate 34 to urge main valve element 36 toward seat ring 22 such that first beveled portion 37 engaged beveled seating surface 23.

However, the current design of main valve element 36 includes various undesirable characteristics. When pressure is applied to the valve, plastic creep occurs causing a bulge 38 to form in the recess defined between seating surface 23 and valve plate 16. As a result, the material forming main valve element 36 would eventually become fatigued, causing the top surface of the valve element to deform and eventually break off. As a result, frequent maintenance of such devices was required. The angle of first beveled portion 37 was large such that a larger diameter was needed to create a sufficient seal between first beveled portion 37 of main valve element 36 and beveled seating surface 23. This large diameter contributed to the formation of bulge 38. If main valve element 36 failed, hydrant 10 would have to be taken out of service until a new main valve element was installed.

SUMMARY OF THE INVENTION

The present invention provides a main valve element that substantially avoids creep and deformation and itself is useable in a first configuration and a second configuration if a surface of the valve element fails, in that a second valve surface is useable. According to the invention a reversible valve element is provided, each surface having a first beveled surface and a second contoured surface wherein the first beveled surface provides a seating surface and the second contoured surface is contoured to avoid deformation and degradation of the valve element.

Advantages of the invention include a valve that does not easily fatigue under pressure and that is easily capable of being used in multiple configurations. The contoured surface and beveled seating surface along with the multiple configuration capability provide for a reusable, longer lasting valve element.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION OF THE INVENTION

Figure 1:
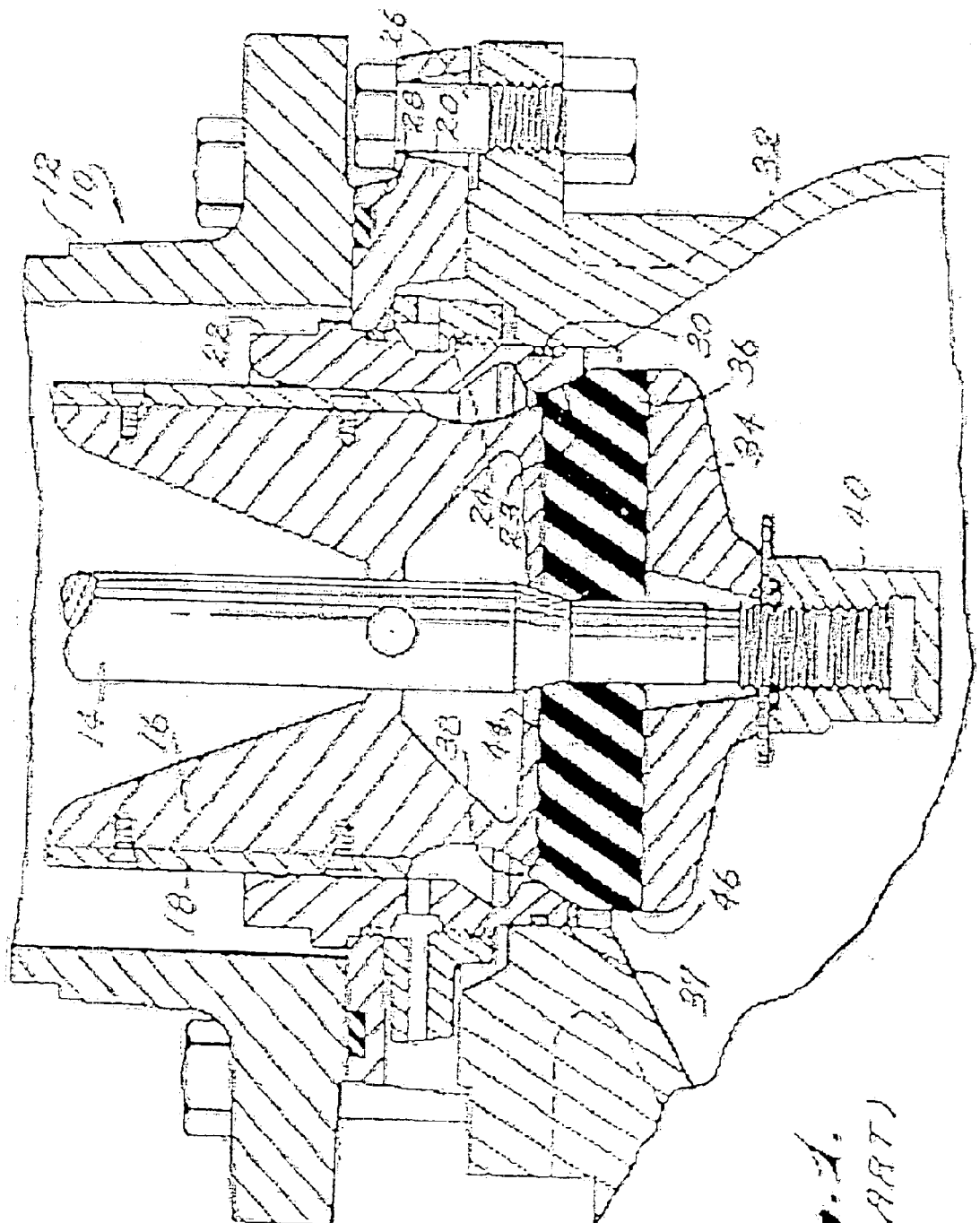
FIG. 1 is a cross-sectional view of a prior art compression-type valve configuration.
Figure 2:
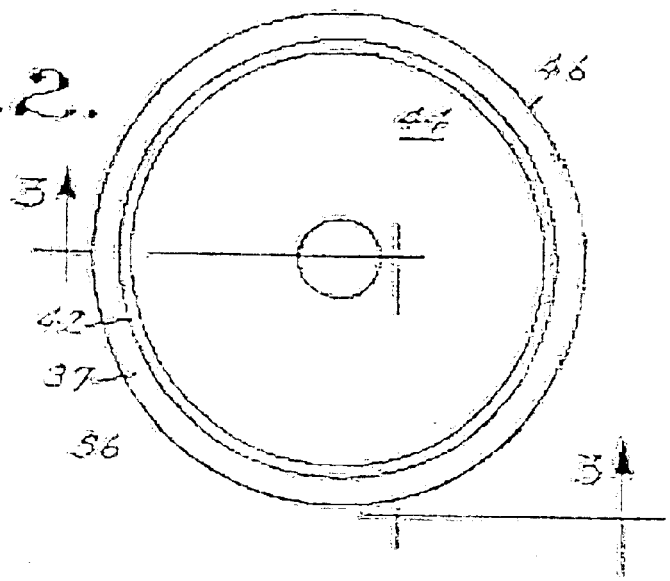
FIG. 2 is a cross-section top plan view of a prior art main valve member.
Figure 3:
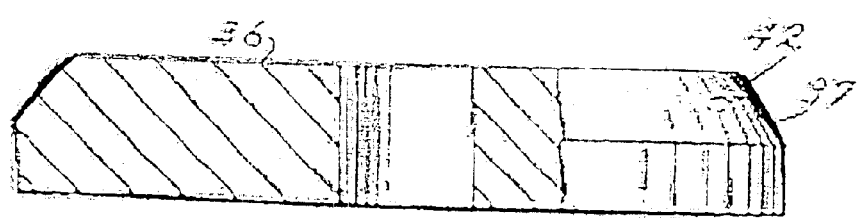
FIG. 3 is a partial cross-sectional view of a prior art compression-type valve configuration.
Figure 4:
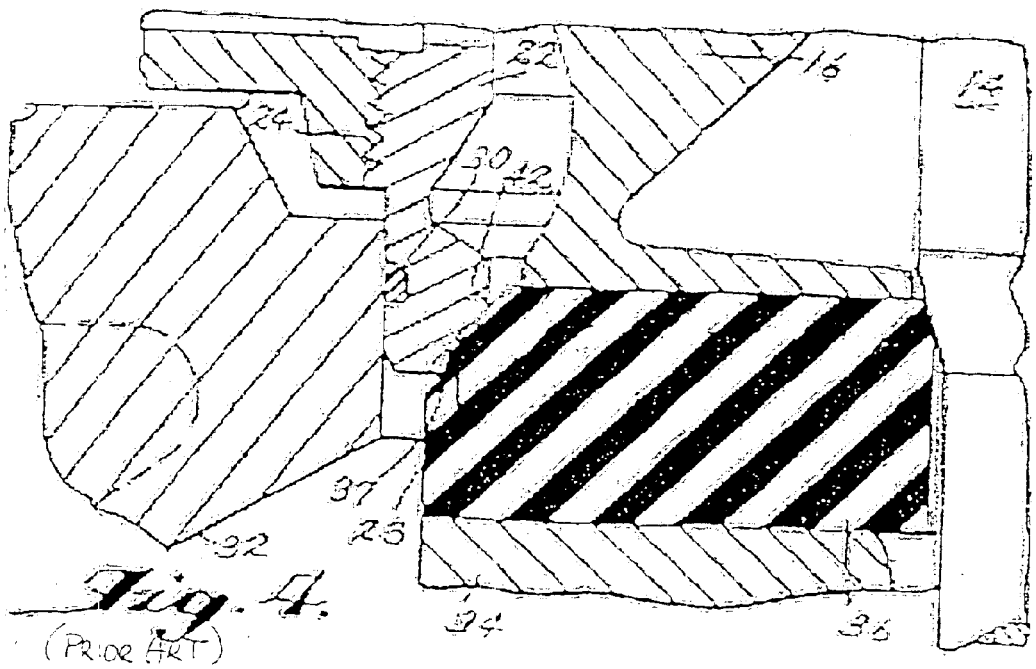
FIG. 4 is a cross-sectional view of a prior art valve seat configuration.
Figure 5:
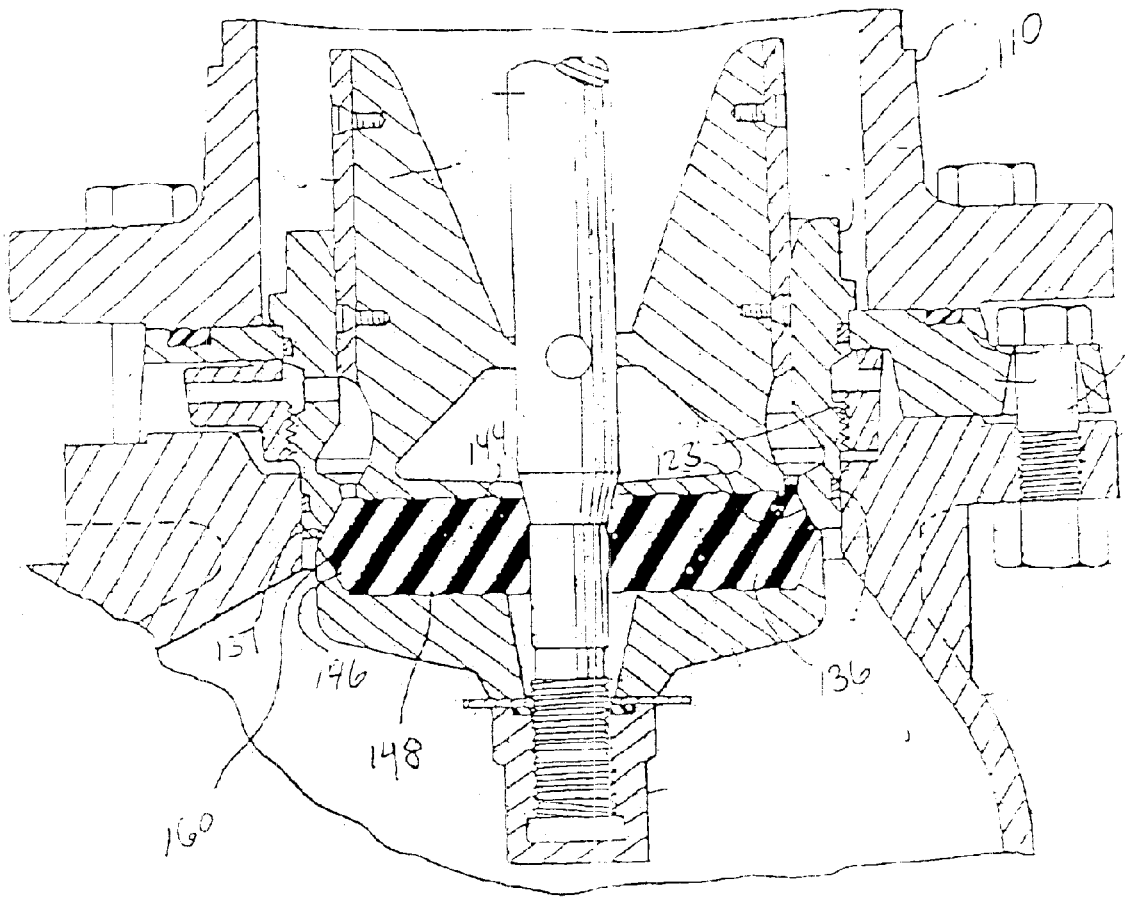
FIG. 5 is a cross-sectional view of a compression-type valve configuration, in accordance with an exemplary embodiment.
Figure 6:
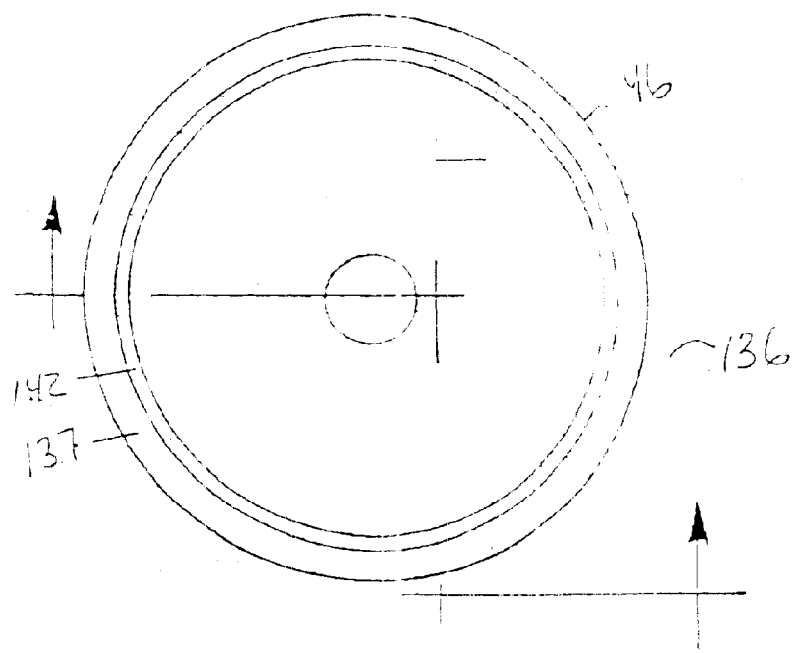
FIG. 6 is a cross-section top plan view of a main valve member, in accordance with an exemplary embodiment.
Figure 7:
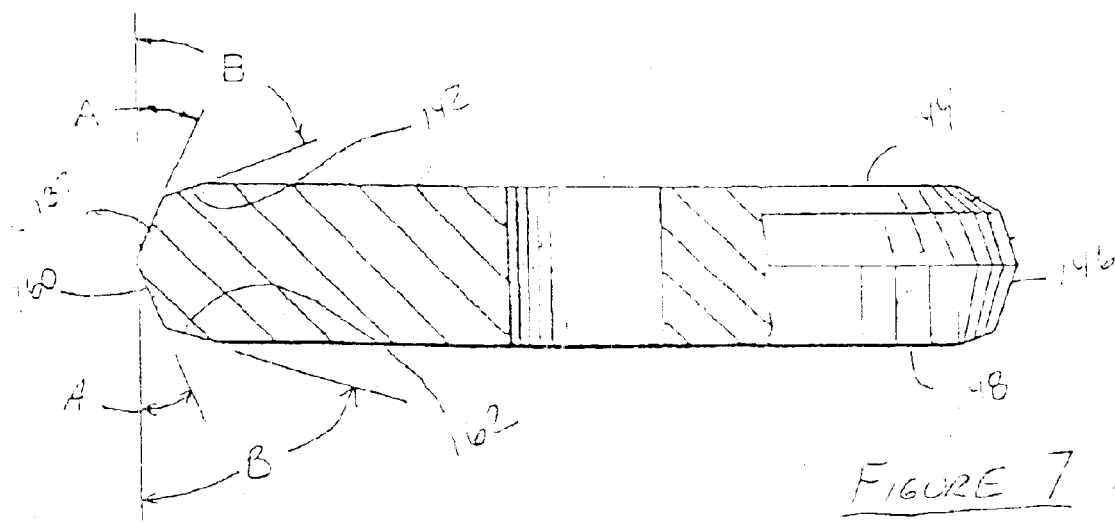
FIG. 7 is a partial cross-sectional view of a compression-type valve configuration, in accordance with an exemplary embodiment.
Figure 8:
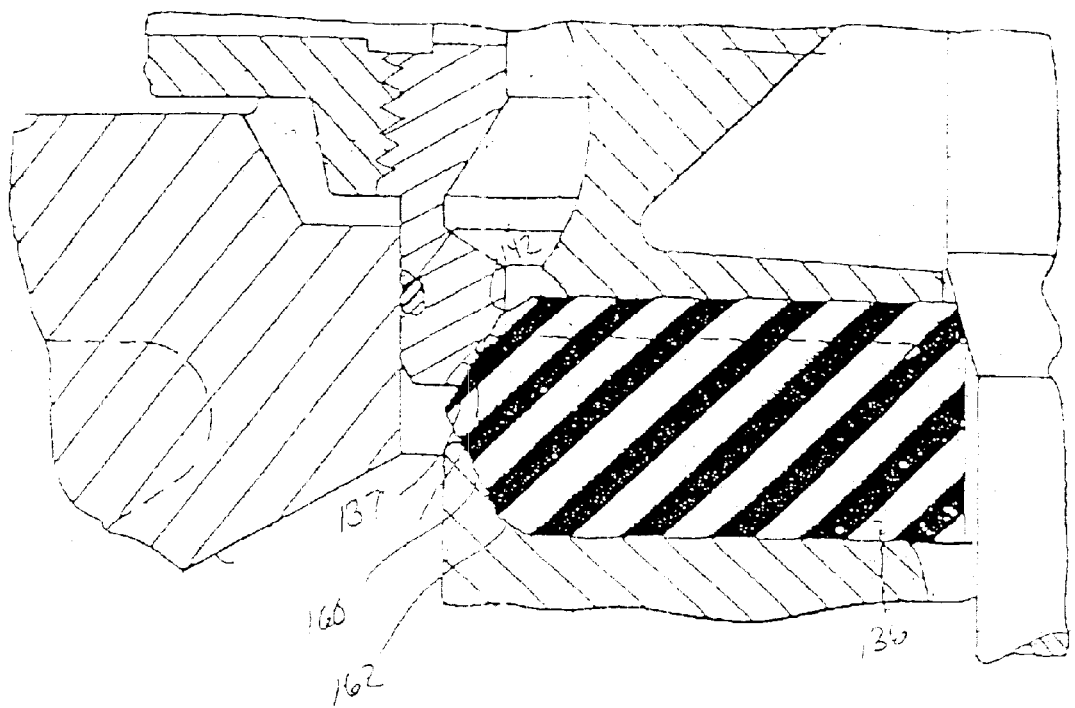
FIG. 8 is a cross-sectional view of a valve seat configuration, in accordance with an exemplary embodiment.

Referring to FIG. 5 through FIG. 8, a hydrant 110 is shown having a valve that uses a main valve member 136, wherein main valve member 136 includes a side surface 146, a top surface 144 a bottom surface 148, a first beveled portion 137 and a second beveled or contoured portion 142. It will be appreciated that first beveled portion 137 extends from side surface 146 to second beveled or contoured portion 142 at an angle A and contoured portion 142 extends from first beveled portion 137 to top surface 144 substantially at an angle B, wherein B is substantially larger than A. First beveled portion 137 provides a seating portion while the contoured portion 142 represents additional material missing that substantially avoids creep and deformation to extend useful life of the valve element and better seating and sealing over the useful life of the valve. It should be appreciated that the second beveled or contoured portion could be achieved by introducing a radius between the first beveled portion or valve seating portion and the top surface 144.

It should further be appreciate that main valve member 136 also includes a third beveled portion 160 and a fourth beveled or contoured portion 162, wherein third beveled portion 160 extends from side surface 146 to fourth contoured portion 162 at an angle A and fourth contoured portion 162 extends from third beveled portion 160 to bottom surface 148 substantially at an angle B, wherein B is substantially larger than A. Thus, it can be seen that the top portion of main valve element 136 is substantially identical to the bottom portion of main valve element 136. This advantageously allows main valve element 136 to be reversible such that if the top portion of main valve element 136 becomes damaged or fatigued, main valve element 136 may be 'flipped' over such that the bottom portion of main valve element 136 may be used to form a seal with beveled seating surface 123. Thus, reversible main valve element 136 with improved sealing affords the ability to affect a repair even when a replacement part is not available. The matching contours of the upper and lower surfaces facilitate more resilient and better sealing.

This configuration, according to the invention, advantageously allows a sufficient seal to develop between first beveled portion 137 and a beveled seating surface 123 of a seat ring 122 at a smaller diameter, thus providing a higher leak point. Therefore, a greater amount of force per unit area is applied at the interface between seat ring 122 and main valve element 136. As a result, sealing may be accomplished with less total force and less deformation of main valve element 136. Moreover, plastic creep may not occur into the gap between valve plate 116 and seal ring 122, since angle or contour B between first beveled portion 140 and second portion 142 reduces the diameter of main valve element 136 immediately adjacent the gap, advantageously lengthening the life of the valve. The same is provided as described hereinbefore, with respect to the lower surface if/when the valve element is flipped in service.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, top, bottom, upper, lower, etc. do not denote any order or importance or absolute positioning, but rather the terms first, second, top, bottom etc. are used to distinguish one element from another.

Although shown as second beveled and discussed as a contoured surface those skilled in the art should appreciate that in addition to a radius or angle other contour means could be implemented to prevent polymer creep and resultant deformation or fragmentation along the top surface.

Although the invention is described hereinbefore with respect to illustrative embodiments thereof, persons having ordinary skill in the art should appreciate that the foregoing and various other changes, omissions and additions in the form and detail thereof may be made without departing from the spirit and scope of the invention.

What is claimed is:

1. A compression-type valve comprising:
   means defining a first space to which fluid may be supplied;
   means defining a second space to which the flow of fluid is to be controlled;
   a seating ring interposed between said means defining said first and second spaces; and
   valve means for sealingly engaging the seating ring including a resilient cylindrical body having a central axis and having a side surface, a top surface and a bottom surface, a first inward bevel being defined circumferentially from the side surface toward the top surface, a second contour defined circumferentially between the first bevel and the top surface, a third inward bevel being defined circumferentially from the side surface toward the bottom surface, and a fourth contour defined circumferentially between the third bevel and the bottom surface.

2. Apparatus according to claim 1, further comprising means for moving the valve means relative to the seating ring.

3. Apparatus according to claim 1, wherein the second contour is a radius.

4. Apparatus according to claim 1, wherein the fourth contour is a radius.

5. Apparatus according to claim 1, wherein the valve means includes a top portion and a bottom portion, and the top portion of the valve means sealingly engages the seating ring.

6. Apparatus according to claim 5, wherein the top portion of the valve means is substantially identical to the bottom portion.

7. Apparatus according to claim 6, whereby the valve means with identical top and bottom portions is reversible.

8. Apparatus according to claim 7, whereby said reversible valve means is operable to be flipped over such that the bottom portion thereof sealingly engages the seating ring.

* * * * *